(12) United States Patent
Shen et al.

(10) Patent No.: US 10,333,793 B2
(45) Date of Patent: Jun. 25, 2019

(54) NETWORK FABRIC TOPOLOGY EXPANSION AND SELF-HEALING DEVICES

(71) Applicant: Cisco Technology, Inc., San Jose, CA (US)

(72) Inventors: Naiming Shen, Santa Clara, CA (US); Zach Cherian, Cupertino, CA (US); Nag Avadhanam, Cupertino, CA (US); Swapna Yelamanchi, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 92 days.

(21) Appl. No.: 15/487,978

(22) Filed: Apr. 14, 2017

(65) Prior Publication Data
US 2018/0302289 A1 Oct. 18, 2018

(51) Int. Cl.
*H04L 12/24* (2006.01)
*H04L 12/721* (2013.01)
*H04L 29/12* (2006.01)

(52) U.S. Cl.
CPC .............. *H04L 41/12* (2013.01); *H04L 45/26* (2013.01); *H04L 61/2015* (2013.01)

(58) Field of Classification Search
CPC ......... H04L 41/12; H04L 67/02; H04L 45/74; H04L 45/26; H04L 61/2007; H04L 67/141; H04L 29/06095; H04L 29/0653; H04L 49/3009; H04L 49/309
USPC ........................................................ 370/392
See application file for complete search history.

(56) References Cited

U.S. PATENT DOCUMENTS

| 9,729,948 | B1* | 8/2017 | Subrahmaniam .. H04Q 11/0005 |
| 2014/0149542 | A1* | 5/2014 | Luo .......................... H04L 45/02 709/217 |
| 2014/0362709 | A1* | 12/2014 | Kashyap ................. H04L 41/12 370/250 |
| 2015/0163152 | A1* | 6/2015 | Li ........................ H04L 47/2441 370/409 |
| 2016/0134527 | A1* | 5/2016 | Kwak .................... H04L 45/586 370/352 |
| 2016/0285750 | A1* | 9/2016 | Saquib ................. H04L 41/0677 |
| 2016/0291904 | A1* | 10/2016 | Fukushima ........... G06F 3/1285 |
| 2016/0315964 | A1* | 10/2016 | Shetty .................... H04L 63/105 |
| 2017/0041209 | A1* | 2/2017 | Joshi ....................... H04L 45/64 |
| 2017/0078210 | A1* | 3/2017 | Wang .................. H04L 41/0803 |
| 2017/0104670 | A1* | 4/2017 | Song ................... H04L 12/6418 |
| 2017/0180213 | A1* | 6/2017 | Li ........................... H04L 29/08 |

(Continued)

*Primary Examiner* — Robert J Lopata
(74) *Attorney, Agent, or Firm* — Meunier Carlin & Curfman LLC

(57) ABSTRACT

An apparatus controls discovery of nodes for a network fabric and accommodates communication among the nodes. The apparatus may be a controller operating as a first node on a network and having a processor connected to memory. The controller is communicatively connected to a second node that has a native network protocol. The memory stores computer readable software instructions that, when implemented by the processor, cause the controller to send a discovery data packet to the second node in the second node's native network protocol. The discovery data packet advertises controller status information to the second node for use in establishing a communications link between the controller and the second node in the network fabric.

15 Claims, 9 Drawing Sheets

(56) References Cited

U.S. PATENT DOCUMENTS

| | | | |
|---|---|---|---|
| 2017/0195292 A1* | 7/2017 | Pham | H04L 63/0245 |
| 2017/0257228 A1* | 9/2017 | Chen | H04L 45/04 |
| 2017/0337394 A1* | 11/2017 | Wang | H04L 67/16 |
| 2018/0013630 A1* | 1/2018 | Tatlicioglu | H04L 41/12 |
| 2018/0062990 A1* | 3/2018 | Kumar | H04L 45/70 |
| 2018/0199218 A1* | 7/2018 | Ashrafi | H04W 24/04 |
| 2018/0248755 A1* | 8/2018 | Hecker | H04L 41/0816 |

\* cited by examiner

NETWORK FABRIC TOPOLOGY EXPANSION AND SELF-HEALING DEVICES

TECHNICAL FIELD

This disclosure relates to the field of Software Defined Networks (SDNs) that expand in scope by seamlessly integrating components of legacy network systems into a new network fabric topology.

CROSS REFERENCE TO RELATED APPLICATIONS

None.

BACKGROUND

In data center and campus networks, fabric based topology can be used for managing software defined networks (SDN) and implementing those networks for communications with existing legacy networks, such as spanning tree protocol (STP) systems. In particular, regarding the field of campus networks, a software defined topology cannot be strictly enforced in a legacy CLOS topology. With further regard to a campus environment, the internal connections of legacy systems depend on the existing cabling scheme in the campus. Implementing a fabric based topology and requiring a fixed number of fabric internal ports is not a realistic approach.

Some existing automatic discovery mechanisms require initially using an IPv6 link for a local address or assigning specific private addresses that migrate to real link IP addresses later, making those schemes more complicated than necessary. Prior systems for converting legacy networks into a new fabric topology label the device interfaces to be "fabric" or "front-panel" ports either by design or manual configuration by operators. Prior systems of existing network node discovery is mainly for first time bootstrap operations only. Prior systems, therefore, offer limited assistance in automatic, zero-touch node incorporation into a network fabric on a dynamic basis.

A zero touch strategy for converting a legacy system into a software defined fabric network entails automatically bringing up an underlay topology for a virtual switch fabric without the need for configuring and labeling of 1) internal ports 2) the IP link local scheme and 3) the assignment of temporary IP addresses. Similar automation is necessary for a zero touch approach to the self-healing of the internal fabric in the cases of re-cabling, controller switch-over to standby, and the like, which all need to be solved in simpler and more efficient ways.

DETAILED WRITTEN DESCRIPTION

Overview

Figure 1:
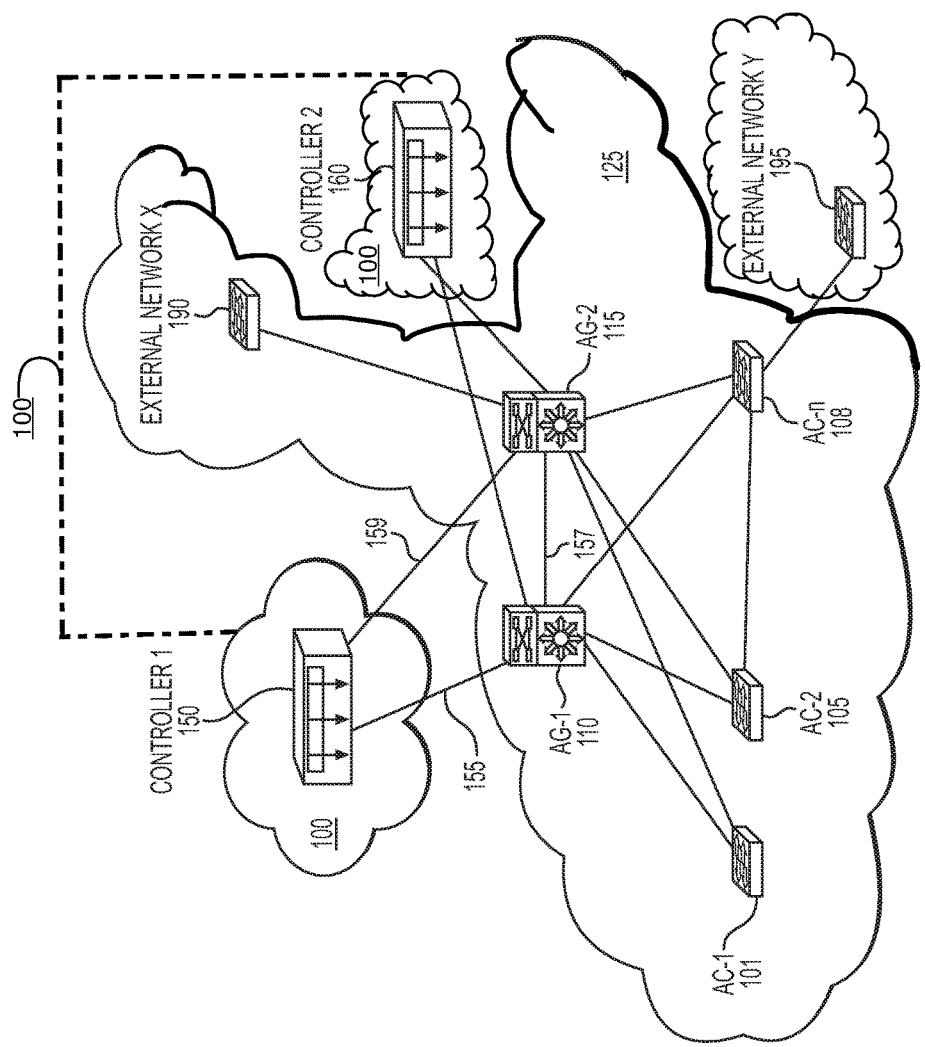
FIG. 1 is an overview schematic of a network fabric utilizing active and standby controllers to connect to a legacy network switches.

In one embodiment, an apparatus controls discovery of nodes for a network fabric and accommodates communication among the nodes. The apparatus may be a controller operating as a first node on a network and having a processor connected to memory. The controller is communicatively connected to a second node that has historically been a part of a legacy network managed with known data link layer protocols, including but not limited to data link layer protocols under OSI layer two. The memory stores computer readable software instructions that, when implemented by the processor, cause the controller to send a discovery data packet to the second node across the data link between the controller/first node and the second node. In one embodiment, the discovery packet is sent via OSI Layer 2. In some embodiments, the second node may also have additional data links to consecutively numbered nodes in a legacy network having nodes that have not been previously admitted into a network fabric for virtual network management. The discovery data packet advertises controller status information to the second node for use in establishing a communications link between the controller and the second node in the network fabric, and the new communications link initiates the joining of the second node to the network fabric that is managed as a software defined network (SDN). Nodes joining the network fabric are subject to centralized management of data routing with tracking of the distribution of data communications across the network fabric.

In another embodiment, a different apparatus enables joining nodes from an existing network to connect to a new network fabric and communicate with a fabric controller. This apparatus includes a first switch node in the existing network and has a switch processor connected to switch memory. The first switch node is configured to be in data communication with and subject to a network fabric controller and an overlay database connected to the network fabric, wherein the first switch node, the joining nodes, and the fabric controller benefit from network management once becoming part of the network fabric as described herein for software defined networks (SDNs). The switch memory includes computer readable switch software instructions that, when implemented by the switch processor, cause the first switch node to expand the network fabric by establishing network fabric overlays between the network fabric controller and the joining nodes in the existing network. To accomplish the network fabric expansion, the first switch node transmits expansion discovery packets to the respective joining node in the existing network. The first switch node also updates the overlay database with updated address information resulting from the transmitting and configures the overlay database such that the first switch node is a one way egress of the expansion discovery packets to the joining nodes. The expansion discovery packets initiate establishing the proper communications links among at least the controller in the network fabric and the respective joining nodes in the existing network. These network fabric communications links provide the avenues necessary for the joining nodes to become a full participant in the network fabric with the associated benefit of virtual tracking and communications.

A corresponding method of discovering nodes in an existing network to accommodate communication between the existing network and a software defined network includes operating a controller having a processor, connected to computer readable software stored in memory, as a first node on a network. Connecting the controller to a second node allows for sending an initial discovery data packet from the controller to the second node to begin network fabric expansion. The initial discovery data packet advertises controller status information to the second node and establishes a new communications link between the controller and the second node in the network fabric using the status information.

Embodiments

In a first embodiment, an apparatus such as controller 150 operates as a first node in a network fabric 100 shown in FIG. 1. The network fabric 100 of FIG. 1 is a collection of telecommunications hardware devices that may be part of a software defined network (SDN) implementing OSI layer three communications, utilizing routed connections across networks, with packet based transmissions providing the data links. Other devices shown as nodes for telecommunications in FIG. 1 may be configured for OSI layer 2 transmission among connected nodes, as would be prevalent in a legacy network 125 (External Network X). In one example, a legacy network 125 may communicate with traditional switching protocols that direct packets to specific switch ports based on destination MAC addresses.

One goal of the embodiments disclosed herein is to allow for new software defined network fabrics to communicate with legacy network nodes in a way to accommodate joining nodes being included in the software defined network without extensive updating for addressing, extensive reprogramming, and equipment purchases (i.e., the "zero touch" procedure). Taking FIG. 1 as an example, in one non-limiting embodiment, controller 150 is an apparatus controlling discovery of nodes for the overall network fabric 100 and accommodating communication among the nodes with packets routed via a software defined network (e.g., utilizing OSI layer 3 protocols). In this regard, the controller 150 operates as a first node on a network 100 and includes a processor connected to non-transitory computer readable media implementing computerized memory incorporating software instructions. The controller 150 may be configured to implement features of a software defined network communicating in OSI layer three protocol for virtual data transmission management. A standby controller 160 is similarly configured within the software defined network 100 to provide fail-safe operations over the network fabric 100.

Other components of FIG. 1 include aggregation switches 110, 115 and access switches 101, 105, 108 depicted in one example as being a part of an existing legacy network 125 operating in traditional protocols other than software defined routing. With the controller 150 (or if necessary, standby controller 160) operating as a first node in a software defined network fabric (SDN) 100, nodes in connected legacy systems (such as FIG. 1 aggregation switches, access switches, and external networks X, Y) benefit from architectures that allow for communications links between the legacy system nodes and the controller as well as the utilization of network routing protocols and management techniques, such as but not limited to virtual OSI layer three communications.

In embodiments utilizing a controller 150, 160 as a first node in a network fabric 100, a second node may be a legacy network node, such as aggregation switch 110, for example. As shown by the connecting line 155 of FIG. 1, the controller 150 is communicatively connected to the second node 110, often with traditional switching across physical ports. In other embodiments, the second node may be a different aggregation switch 115 or access switch 101, 105, 108, depending upon the circumstances. To institute reliable communications within a software defined network fabric, the controller 150 includes software stored in memory that, when implemented by the processor, causes the controller 150 to send a discovery data packet, FIG. 2, Ref 200, to the legacy network at the second node (aggregation switch 110). As discussed below, the discovery packet may be transmitted by the controller 150 in a protocol that is readily consumed by the second node, such as OSI layer 2 communications or whatever native transmission protocol is appropriate for the legacy network. In one embodiment, the system disclosed herein results in the controller 150 utilizing OSI layer 3 communications to communicate with the second node (aggregation switch 110), and the OSI layer 3 protocol can be an interior Gateway Protocol (IGP) implemented as an "intermediate system to intermediate system" (IS-IS) protocol. To accomplish this, the discovery data packet 200 advertises controller 150 status information to the second node 110 for use in establishing a software defined, virtually managed communications link between the controller 150 and the second node 110, and that communications link operates within the software defined network fabric 100. This communications link 155 is configured to provide the data necessary to bring the second node into the network fabric for virtual management as a part of a software defined network.

The communications link 155 does not require the network fabric 100 to be strict CLOS topology, and to maximize the port utilization while keeping the zero-touch approach, in one non-limiting embodiment, this scheme uses the OSI layer 2 packet to advertise the controller's status by using the Ethernet SNAP org code 0x00000C which is reserved by Cisco, and the PID 0x2016. This frame is similar to CDP (Cisco Discovery Protocol) which uses PID of 0x2000. Cisco has often referred to the discovery packets as UrDP™ (Ursa™ Discovery Protocol) packets.

Figure 2:
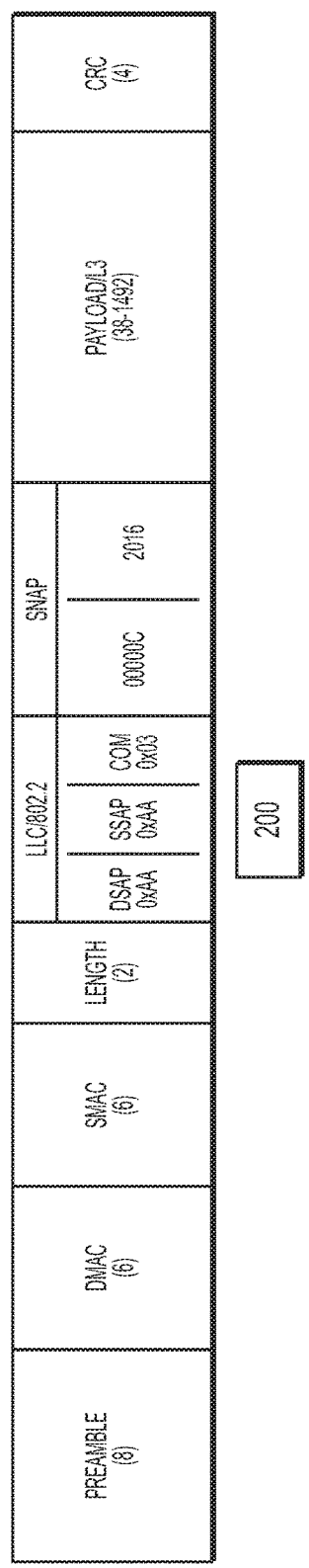
FIG. 2 is a schematic of a data packet advertising a node's status in a network fabric as described herein.

An example of a discovery data packet 200 is illustrated in FIG. 2 and configured to incorporate at least one of a MAC address for the communications link 155 between the controller 150 and the second node 110, an SNMP index, a first node IP address (e.g., controller IP address), a type length value of the first node IP address, and a second node IP address. Continuing with the use of the controller 150 as a first node, the second node 110 returns a second discovery data packet to the first node/controller 150 that includes a secure unified device identifier (SUDI). Again, these communications may occur in the protocol that both nodes are capable of utilizing for the desired result of including the second node in the network fabric 100. The communications between the controller 150 and the second node 110 establish an http or https communications link, i.e., the new network fabric communications link as opposed to the initial discovery packet transmission, for additional data transmission, such as sharing a controller ID, a second node ID, the controller's loop back address, and an interior gateway protocol (IGP) password. For each node added to the controller's network fabric, when a link from the controller 150 is connected to another node, the controller will send out this discovery data packet 200 to advertise this link's MAC address and SNMP index. Upon establishing the http or https connection and sharing a controller ID, a second node ID, the controller's loop back address, and an interior gateway protocol (IGP) password, the added node is managed as a part of the overall software defined network (SDN), or network fabric 100. In this scheme, the only user input required on the controller are the 'Domain-Name' and IGP password for IGP packet authentication in the fabric. The controller itself is part of the fabric and assigns itself a node identification, for instance, Node-ID 1.

Figure 3:
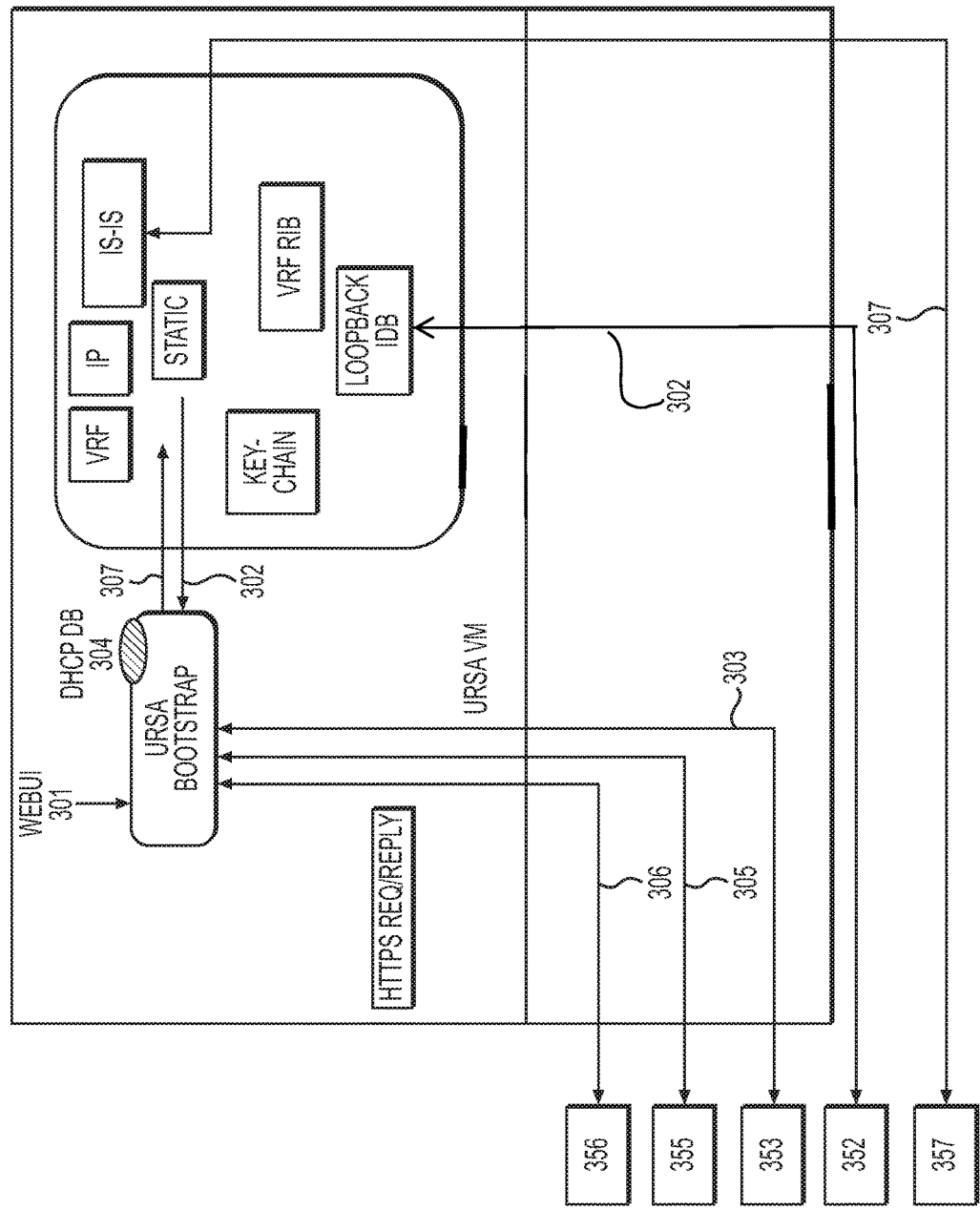
FIG. 3 is a schematic of a controller used in a network fabric as described herein.
Figure 4:
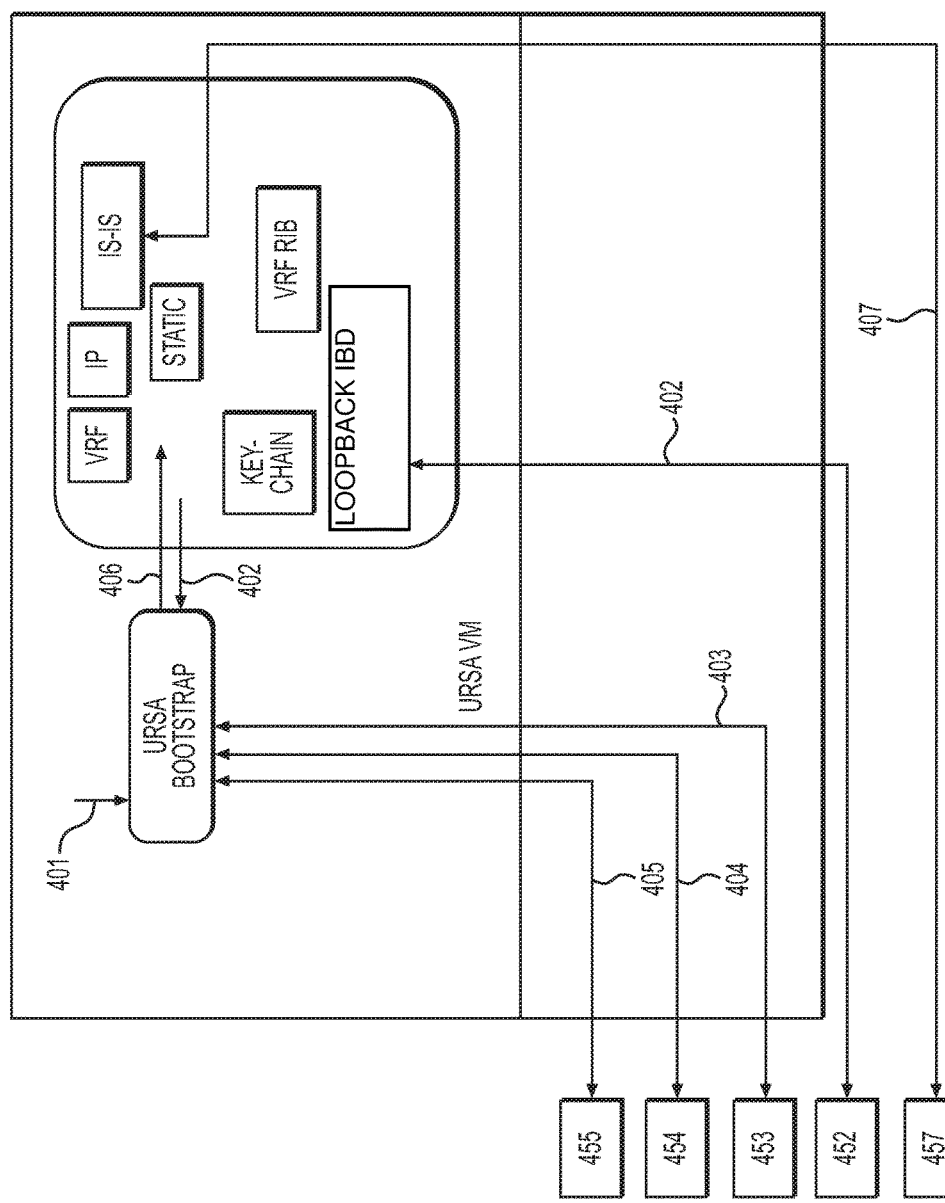
FIG. 4 is a schematic of a standby controller used in a network fabric as described herein.
Figure 5:
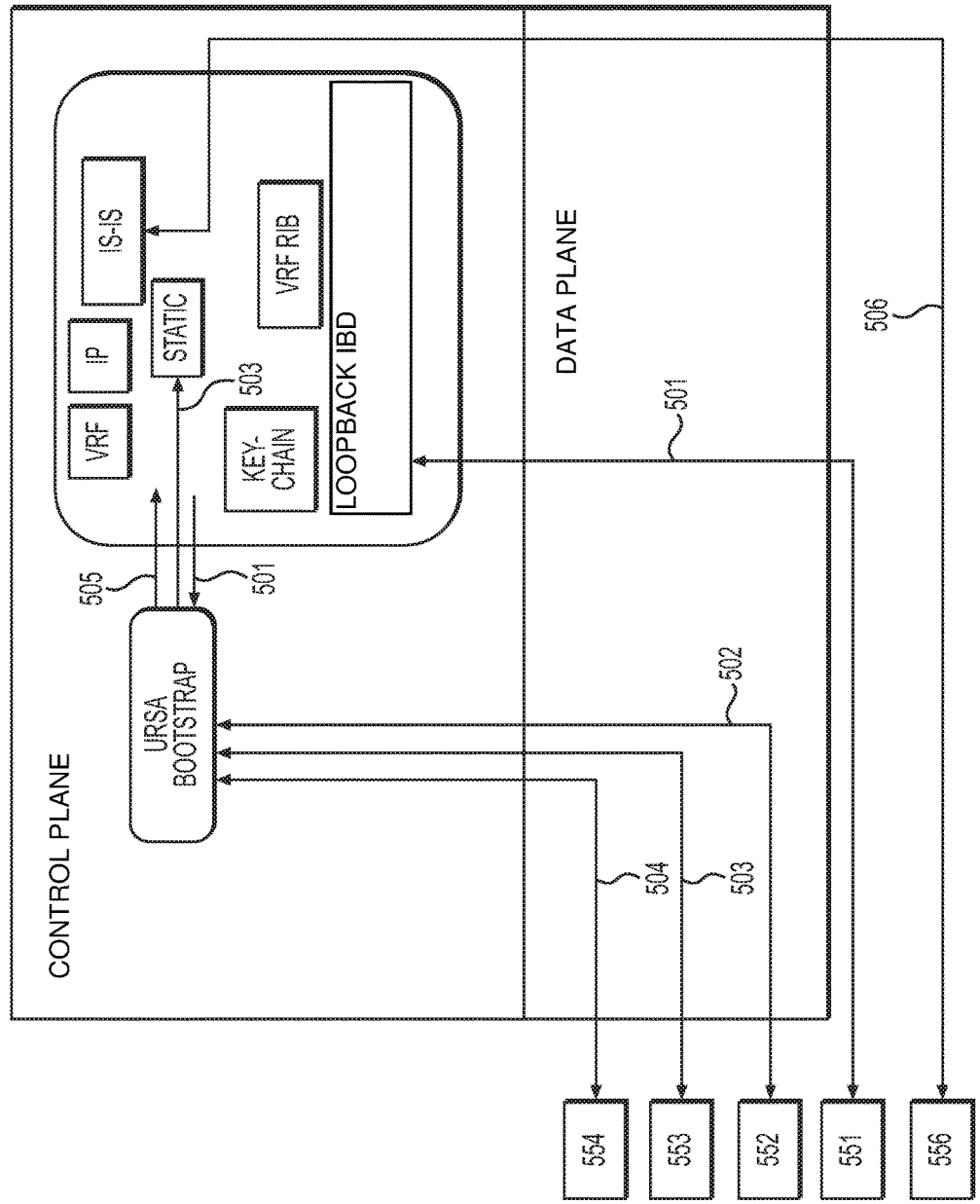
FIG. 5 is a schematic of an aggregating switch of a legacy network connecting to the controller of FIG. 3 via a network overlay.

FIGS. 3-5 of this disclosure illustrate data transmission paths to implement the embodiments of this disclosure by which a controller 150 and/or a stand-by controller 160 communicate with nodes of a legacy network. The controller 150 is a first node in a new network fabric and has the processor power and memory to establish a communications link 155 that communicates with the second node to eventually establish a communications management scheme among nodes of the new network fabric and nodes of the legacy network. The controller 150 behaves the same as other member switches in the network fabric 100 in terms of connecting to additional nodes. Both sides will exchange the data discovery packets 200.

When a legacy switch 110 has never been admitted into the fabric 100, the legacy switch does not have the Node-ID and Domain-Name of the controller. Thus the controller 150 side of this link is the "master" on the link. The master in this case for one of the controller links will request the IP prefix using DHCP option 220 to get a /30 IP block from the server (which could be on the controller itself). The controller 150 assigns one of the IP addresses to the communications link 155 on the local/controller side, and using a data discovery packet 200, it propagates another IP address on the same prefix to the neighbor switch 110 that is to be added to the new network fabric. The discovery data packet 200 contains the time length value (TLV) of local IP address, remote/slave side of the IP address, and the controller's loopback address. At the second node (switch 110), the "slave" side of the link at the second node gets the assigned IP address from the data discovery packet and the second node 110 (i.e., the slave to the master controller 150 for this link 155) configures the default static route towards the next-hop of the master controller's IP address; thus, without IGP routing, the slave side of this link 155 can communicate with the controller using the source IP address as the link IP address, and destination side IP as the controller's loopback address. It can now launch a HTTPS session to the fabric controller.

The slave side node 110 on this link uploads the SUDI (Secure Unified Device Identifier) to the controller for fabric membership verification. The slave node on the link (i.e., the second node) will get the controller's certificate and it can launch HTTPS to the controller 150. It will get the local switch's loopback IP address, the Domain-Name, and the IGP password from the fabric controller 150. Both sides of the new link now have the necessary information to provision the IGP on this link with authentication. The switch 110, or second node, is now brought into the fabric domain, and the switch is directly connected to the controller 150.

In each of the above described communications links used to include a node into a software managed network fabric, a respective master side of a communications link (i.e., the controller 150 in the above example) has a connection to a fabric host tracking database 880 from which the controller 150 receives an IP prefix, and computer readable software instructions resident on the master side of the link assign a controller IP address and a second node IP address with the IP prefix. The addressing and other networking data is transferred to the second node 110 in the second node's native network protocol, allows for an initial http or https communication link, and ultimately allows for the first and second node to transfer information across the fabric in whatever native network protocol is appropriate.

The apparatus and its operation as described above are equally embodied in establishing connections between the "second node" described above and another node (i.e., $3^{rd}$, $4^{th}$, $5^{th}$, . . . $n^{th}$ node). When one of the nodes or both nodes in a communication link designed to expand the network fabric have already connected into the fabric, then the controller 150 will have previously advertised the controller's Domain-Name, and Node-ID to at least the earliest connected fabric node. Thereafter, the earliest connected node (i.e., the "master on the link") of the two nodes 110, 115 will have established a communications link with the later connected node as a slave on the link 115. In this situation, the master on the link would have been responsible for assigning the local and peer IP addresses for the slave on the link and recording these addresses in the overlay database 880. In this embodiment, there is a "master on the link" 110 and a "slave on the link" 115 for this discovery (and for self-healing discussed below). The master on the link will use DHCP option 220 to get the IP prefix of /30 from the controller (since the master on the link is part of the fabric already), and the same way as the controller 150 above, it will assign one IP address locally and propagate the other to the slave 115 of the link, and pass the controller's loopback IP address through the discovery data packets. The slave on the link will directly communicate with the controller using HTTP and HTTPs link 159 to get all the information as described above. This newly added switch 115 will communicate with the neighbor via IGP running over the link.

For situations in which a network requires a new link between two nodes already in a fabric, the same scheme for electing the "master on the link" is used. The lower Node-ID, indicating which node was added to the network fabric first, establishes which node on the link wins and becomes the master on the link. The master on the link only needs to request the IP address from the database 880, assign the IP address locally and transmit that information to the slave on the link. But there is no HTTP step in this case, since the node information such as Domain-Name, Node-ID and IGP password has already been obtained from the first time the nodes joined the fabric.

Figure 8:
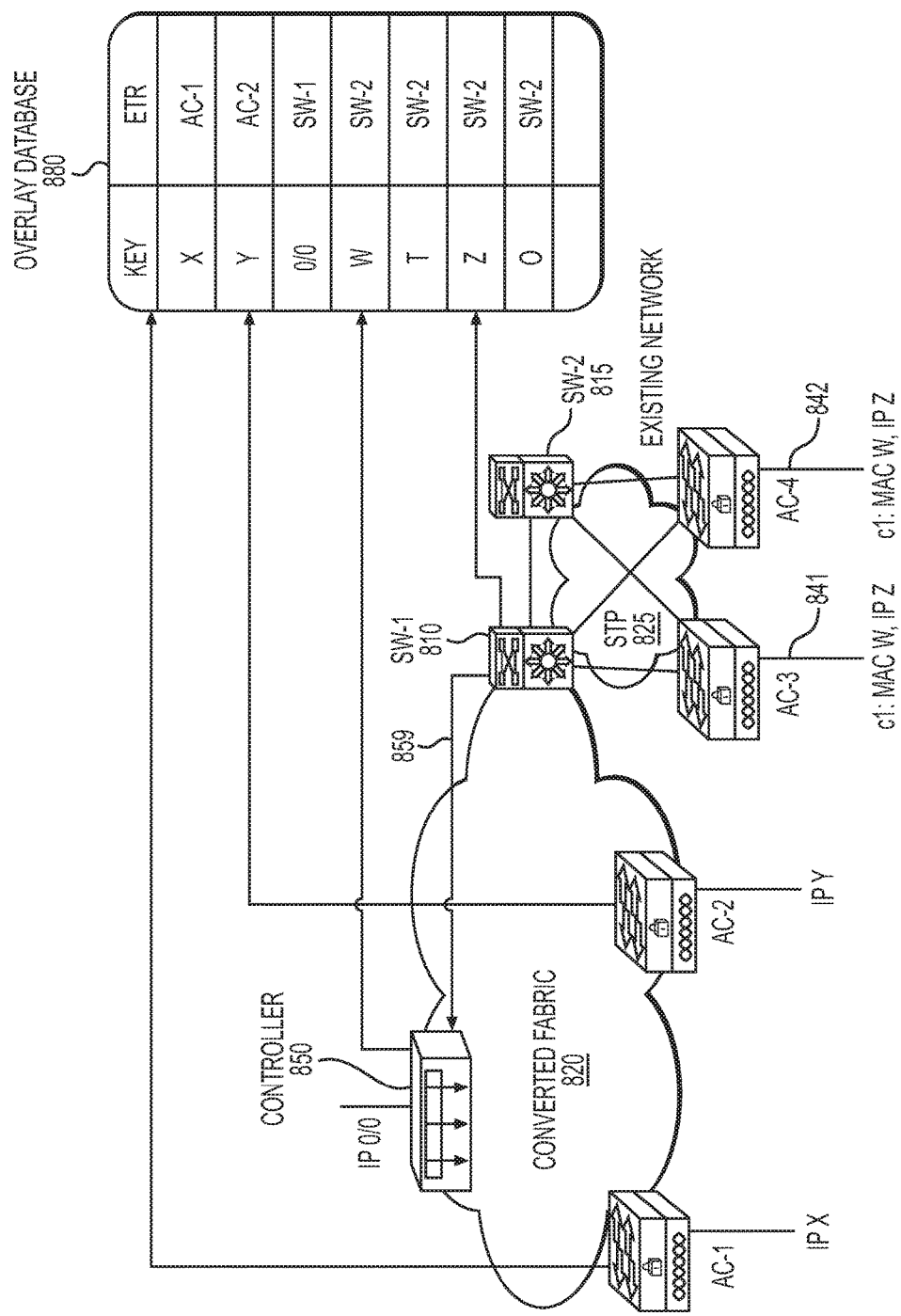
FIG. 8 is a schematic of a network fabric as described herein expanding with nodes from an existing legacy network.

In some network configurations, for example as shown in FIG. 8, a customer switch 815 or host will need to be connected to a switch 810 that has already connected to a software defined network fabric 820. The fabric switch (FIG. 8, ref 810) will send out the discovery data packet 200 to advertise the new fabric information, but the fabric switch 810 will not get a discovery packet 200 response from the neighbor switch or host. And this packet sent to the customer device 815 will not cause any unintended consequences. When the controller 850 determines a recently added port in the network fabric 820 is a customer port, the controller uploads the MAC and IP information into the fabric host tracking database 880 (e.g. in ACI or LISP based fabric protocols), and the discovery data packets can stop being sent out.

In other embodiments, an apparatus according to this disclosure may be a first switch node 810 as illustrated in FIG. 8 herein. The first switch node may be an aggregation node or access node, so long as the first switch node 810 is part of an existing or legacy network 825 but has a sufficiently robust switch processor in communication with switch memory allowing the first switch node 810 of the legacy network 825 to be in data communication with a controller 850 within a software defined network fabric 820 as described above. The first switch node 810 of the legacy network may also be in data communication with an overlay database 880 configured to accommodate a network fabric 820 in expanding its fabric node count to include additional joining nodes 815, 841, 842 from the legacy network. As described above for earlier embodiments, the first switch node 810, the joining nodes 815, 841, 842, and the fabric controller 850 have respective native network protocols for communications across their native networks.

In the embodiment of FIG. 8, the switch memory in the first switch node 810 includes computer readable switch software instructions that, when implemented by the switch processor, cause the first switch node 810 to expand the network fabric 820 by establishing network fabric overlays between the fabric controller 850 and the joining nodes 815, 841, 842 in the existing network. The first switch node 810 accomplishes this by transmitting, in a respective joining node's native network protocol, expansion discovery packets 200 to the respective joining node in the existing network. The first switch node also updates the overlay database 880 with updated address information resulting from the exchange of expansion discovery packets, originally received from the controller 850, with joining nodes across the legacy network. The first switch node 810, therefore, configures the overlay database 880 such that the first switch node is a one way egress of the expansion discovery packets to the joining nodes.

Once the joining nodes have the data discovery packets 200, and the overlay database 880 has been properly updated, the joining nodes, such as a second switch node 815 of FIG. 8 or one of the access nodes (841, 842) of FIG. 8, are equipped to establish communications with the controller 850 of the converted fabric 820. The controller 850 of the converted network fabric 820 then provides the same services described above in which the controller is considered a first node of an overall network fabric and the joining node is considered a second node in the terminology of the above example. In other words, when the joining node receives an expansion data discovery packet from the first switch node of the existing network, the joining node on one side of the link is a new node joining the fabric, and the other side, the first switch node, is already in the fabric. The side already in the fabric is the master (since it already has the Node-ID). The master will use DHCP option 220 to get the IP prefix of /30 from the controller (since the master side is part of the fabric already). In the same way as the controller 150 of FIG. 1 above, the master side 810 of the new link 857 will assign one IP address locally and propagate another IP address to the slave side 815 of the link 857. The master side of the link also passes to the newly joining node (the slave) the controller's loopback IP address through the expansion discovery packets 200. The slave side 200 of the link will directly communicate with the controller 850 using a HTTP and HTTPs link 859 to get all the information as described above. This new joining node will communicate with its neighbor 810 (the first switch node), with IGP running over the link 857. In one sense, therefore, the expansion discovery packets 200 initiate communication, in any of the respective native network protocols, among at least the controller 850 in the network fabric and the respective joining nodes 815, 841, 842 in the existing network. Overall, the first switch node 810 is configured to communicate with the controller 850, via the network fabric, by receiving an initial discovery data packet 200 from the controller 850. The first switch node is also configured to identify a connection to a joining node 815, 841, 842 as running under an OSI layer 2 or OSI layer 3 protocol and continue the communications under a respective native network protocol.

The apparatuses described above are useful in performing associated methods for discovering nodes in an existing network to accommodate communication between the existing network and a software defined network. According to the method disclosed herein, multiple kinds of communications protocols can be utilized among nodes of a network fabric by operating a controller having a processor, connected to computer readable software stored in memory, as a first node on a network and connecting the controller 150 to a second node 110 that has a native network protocol, the controller 150 is able to send an initial discovery data packet from the controller to the second node. The initial discovery data packet advertises controller status information to the second node and establishes a communications link between the controller 150 and the second node 110 in the network fabric using the status information. The controller of the network fabric connects to a fabric host tracking database 880, and the method of this embodiment includes the controller retrieving an IP prefix from the fabric host tracking database, assigning a controller IP address and a second node IP address with the prefix, and establishing an HTTPS communication session 155 between the controller 150 and the second node 110 to enable the second node to receive the controller status information.

The method of this disclosure further includes expanding the network fabric to include joining nodes 815, 841, 842 of an existing network having respective native network protocols. Considering the first node and second node terminology of the above examples, expanding the network fabric in which the controller 850 resides involves the "second node" described above being identified as a "first switching node" 810 of an existing network that is not inherently compatible with the network routing protocol of the controller 850 in the new network fabric. This first switching node may be an aggregation node as shown in FIG. 8 as SW-1 and resides as a boundary node of an existing network. The first switching node 810 is connected to at least one joining node 815 in the existing network.

Connecting the first switching node to an overlay database 880 empowers the first switching node to provide updated address information for communication links in the existing network as the existing nodes 815, 841, 842 join the new network fabric (i.e., as joining nodes establish connections with the controller 850 of the fabric). The updated address information may include updated MAC addresses or IP addresses as necessary to allow the joining nodes to communicate seamlessly with nodes in the network fabric. Updating the overlay database on the existing network side of the communications links enables the existing network to have a boundary node 810 serving as an intermediary between the new network fabric 820 and the legacy network 825. The boundary node (i.e., in the examples here, the first switching node) is a one way egress point for expansion discovery data packets that communicate controller connection information to joining nodes of the existing network.

Upon receiving the expansion discovery packets and having proper information to find a communications link with the network controller, the joining nodes operate in the same way as the above described "second node" of FIG. 1.

In other words, the above described "first switching node" will send out expansion discovery packets to joining nodes and advertise the fabric information, particularly information necessary for a joining node to connect to a fabric controller. The first switch node, however, will not get discovery packets back in response from the joining node. This expansion data packet sent to the joining node will not cause any unintended consequences. When the controller decides that a port at a joining node is a customer port and uploads the MAC and IP information into the fabric host tracking database (e.g. in ACI or LISP based fabric), the expansion discovery packets can stop being sent out.

The method described herein is useful in other situations, such as for establishing a new link between two nodes already in a network fabric. The same scheme for electing the 'master on the link' is used. The lower Node-ID node wins and becomes the master on the link. The master on the link needs to request and assign the IP address locally and to the slave on the link. But there is no HTTP step in this case, since the node information such as Domain-Name, Node-ID and IGP password has already been obtained from the first time the node joined the fabric.

The method of this disclosure may assist in the controller and all database entries accommodating situations when an internal cable is changed from one port into another port. This can be parallel links between two fabric nodes, or one access switch connecting to multiple aggregation switches. Whenever the link goes 'DOWN' and 'UP', the expansion discovery packets will be sent out to explore. In this case, either one side of the link has the assigned IP address and the other side of the link does not have an IP address over the link, or the IP prefixes in the discovery packets sent by both sides, do not match. Based on the same procedures, the side with lower Node-ID will be the master to allocate and to assign the link IP prefix.

In other scenarios, the apparatuses and methods allow for a controller to switch-over to standby. The IGP forms the fabric routing, and it includes the active controller and the standby controller. Active controller syncs over the state to the standby just as the active RP syncing over to standby RP or supervisor. This scheme using IGP to allow the active controller and standby controller to advertise status. When the standby controller detects the active controller is disconnected in the topology, it will change the status to announce itself as "active" and all the switch members in the fabric will communicate with the new active controller.

FIG. 3 illustrates an embodiment of a network fabric controller incorporating the hardware and software sufficient to accomplish the functions described herein. At input 301, a user establishes that the controller 150 has the following initial states:

Self-Identified as "I am Controller and Active"
IS-IS Credential
Crypto Certificates
VRF IP Address Pools
A VRF IP Loopback Address
All the local interfaces.

Communication 302 establishes at logic block 352 from which a link to the second node (e.g., a first switching node 110, 810) is connected and informs the bootstrap function accordingly. Block 353 represents the procedure by which the first switch node 110 is connected to the controller 150 and can receive a discovery data packet back from the first switch node 110. At reference 304 of FIG. 3, the fabric network hosting database is accessible to program the link IP prefix as discussed above for virtual routing and forwarding. Block 355 establishes that the controller 150 provides the second node (referred above as the first switching node, such as AG switch 110), with the slave/switch side link IP address, the master/controller IP address, and the controller loopback address. In return, at block 356, the slave side is programmed to retrieve via an established https communications link with the controller, for network fabric certification and to obtain the second node (slave) loopback IP address, and IS-IS credential, and the second Node ID. Block 357 is the route for configuring IS-IS communications on the link between the controller and the slave node.

FIG. 4 herein illustrates the hardware, software and controller operations necessary to switch a controller from active to standby and vice versa. At block 451, the controllers 150, 160 establish their initial states, which may require the previously inactive standby controller 160 to take over as the active controller. As shown at block 452, the standby controller 160 can utilize a previous connection to either the previously active controller 150 or to a switch node that has already been connected to the new network fabric. The standby controller's bootstrap configuration is made aware of this connection, and at blocks 453-454, the discovery data packet from the previously active controller or a previously joined switch node is received for utilizing in making new connections. As shown in FIG. 455, the standby controller 160 utilizes an above-described https connection to the active controller for the certification process, loopback IDs, IS-IS credential, and node IDs. At 456, the IS-IS link is activated.

Considering the second node (i.e., the first switching node) side of the link with the controller at FIG. 5, the following procedures are in place. At ref. 501, the second node/slave/first switching node connects to the controller and informs the controller that the link is up, and at block 552, the second node (such as the first AG switch 110 of FIG. 1), sends the controller a discovery data packet informing the controller that the second node is URSA capable. At block 553, the controller provides the second node/slave/first switching node with initial discovery data packets and sets the virtual routing and forwarding path to a default route. The controller/master side of the link provides the IP prefix. At block 554, the slave device queries the controller for an IS-IS credential via a previously described https link, along with the slave device requesting the proper slave side IP address and node ID. At block 555, the slave side configures the permanent IS-IS link to the controller and removes the previously established https link, informing the controller that it is an aggregating switch now in the network fabric. Block 557 continues with the second node/first switching node/slave device communicating with the master/controller via a new UP link in an IS-Is protocol. The virtual routing and forwarding processes are in place on the slave side.

Figure 6:
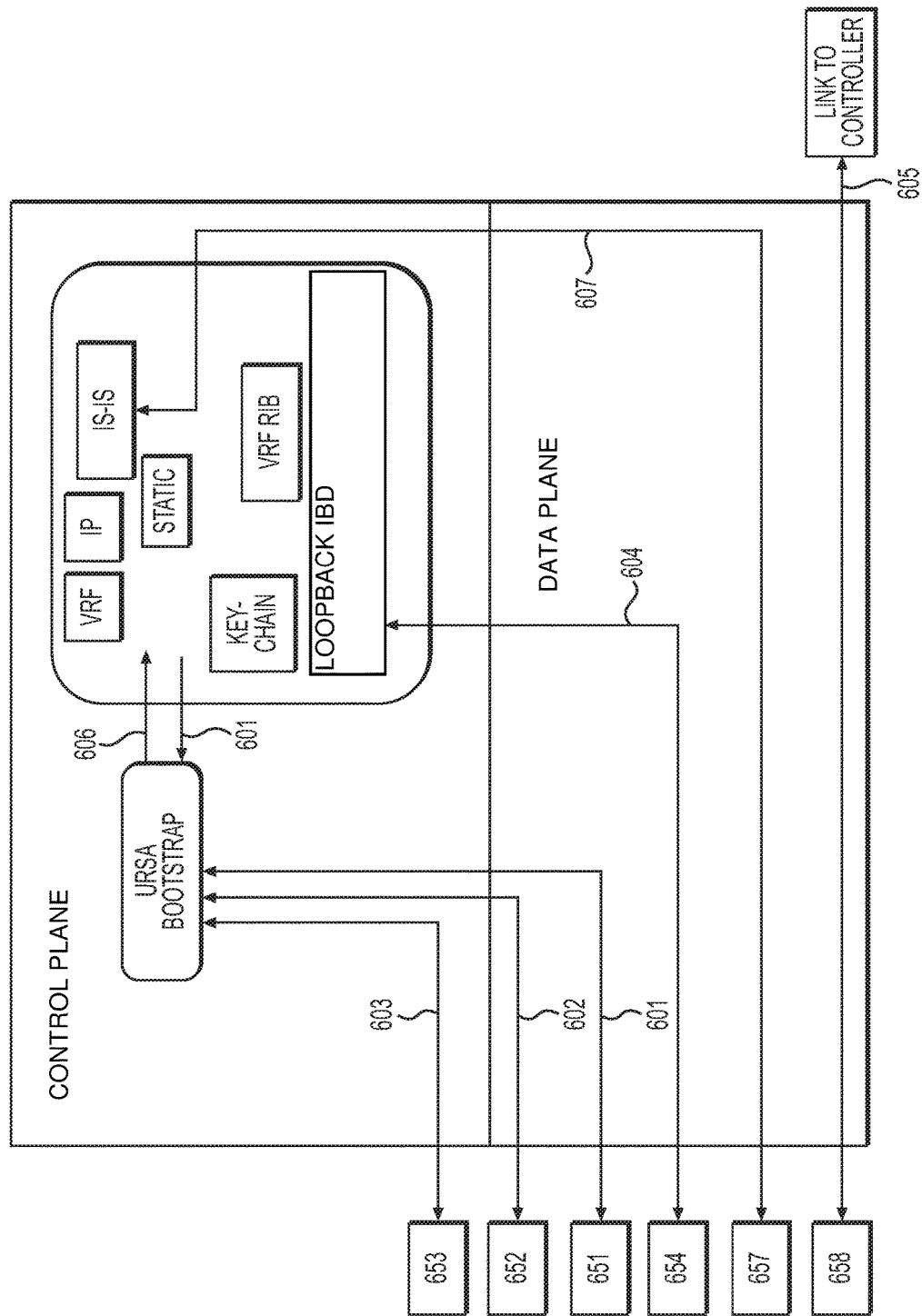
FIG. 6 is a schematic of a second aggregating switch of a legacy network connecting to the aggregating switch of FIG. 4 and the controller of FIG. 3 via a network overlay.

For the 3rd, 4th, 5th, . . . nth nodes added to the new network fabric in which the controller and first switching nodes have been added, the procedures of FIG. 6 are illustrative. In one embodiment, the previously added second node/first switching node/former slave device that has already been added to the network fabric can take on the role of a master node in respect to the 3rd, 4th, 5th, . . . nth nodes which are now slave nodes in the relationship between a previously added switching node and additional joining network nodes. At ref. 601, the new joining node/new slave node connects to the master node and informs the master node that the link is up, and at block 652, the master (such as the first AG switch 110 of FIG. 1 that already joined the new network fabric), receives a discovery data packet from the newly joining node, informing the previously joined master node that the newly joining node is URSA capable. At block 653, the controller will have provided the master node/first switching node with initial discovery data packets including the above described link addresses and node IDs necessary to establish an initial https link. The newly defined master node, such as an AG switch 110, provides this information to the newly joining nodes and sets the virtual routing and forwarding path to a default route. The master side of the link provides the IP addresses and assigns the local and peer IP addresses for the slave node and recording these addresses in the overlay database 880. At block 654, the master device provides the newly joining slave devices with data discovery packets that inform the joining slave device of an IP subnet and configures virtual routing and forwarding on the new link between the master and slave. At this point the slave device, such as an access switch in FIG. 8, has sufficient information to query the controller (which was the ultimate master device originally) at blocks 655-666 for an IS-IS credential via a previously described https link, along with the slave device requesting the proper slave side IP address and node ID. At block 666, the slave side configures the permanent IS-IS link to the controller and removes the previously established https link, informing the controller that it is an access switch now in the network fabric. Block 657 continues with the newly joined slave device communicating with the controller and other nodes in the new network fabric via a new UP link in an IS-Is protocol. The virtual routing and forwarding processes are in place on the slave side.

Figure 7:
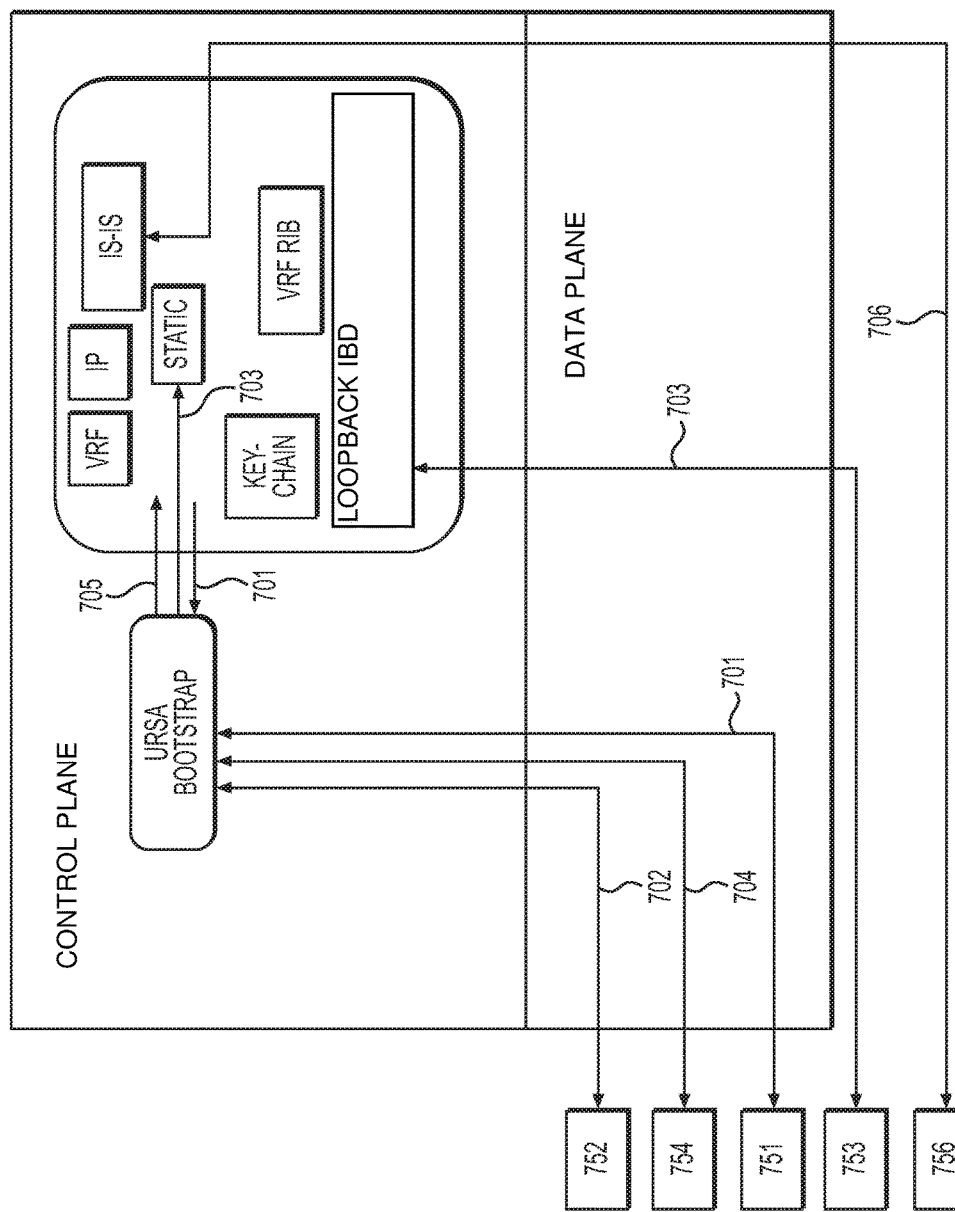
FIG. 7 is a schematic of an access switch of a legacy network connecting to the controller of FIG. 3.

FIG. 7 illustrates the above described procedures from the perspective of the newly joining nodes (3, 4, 5, . . . $n^{th}$ node). Blocks 751-756 correspond to similar blocks of FIG. 5, blocks 551-556.

Figure 9:
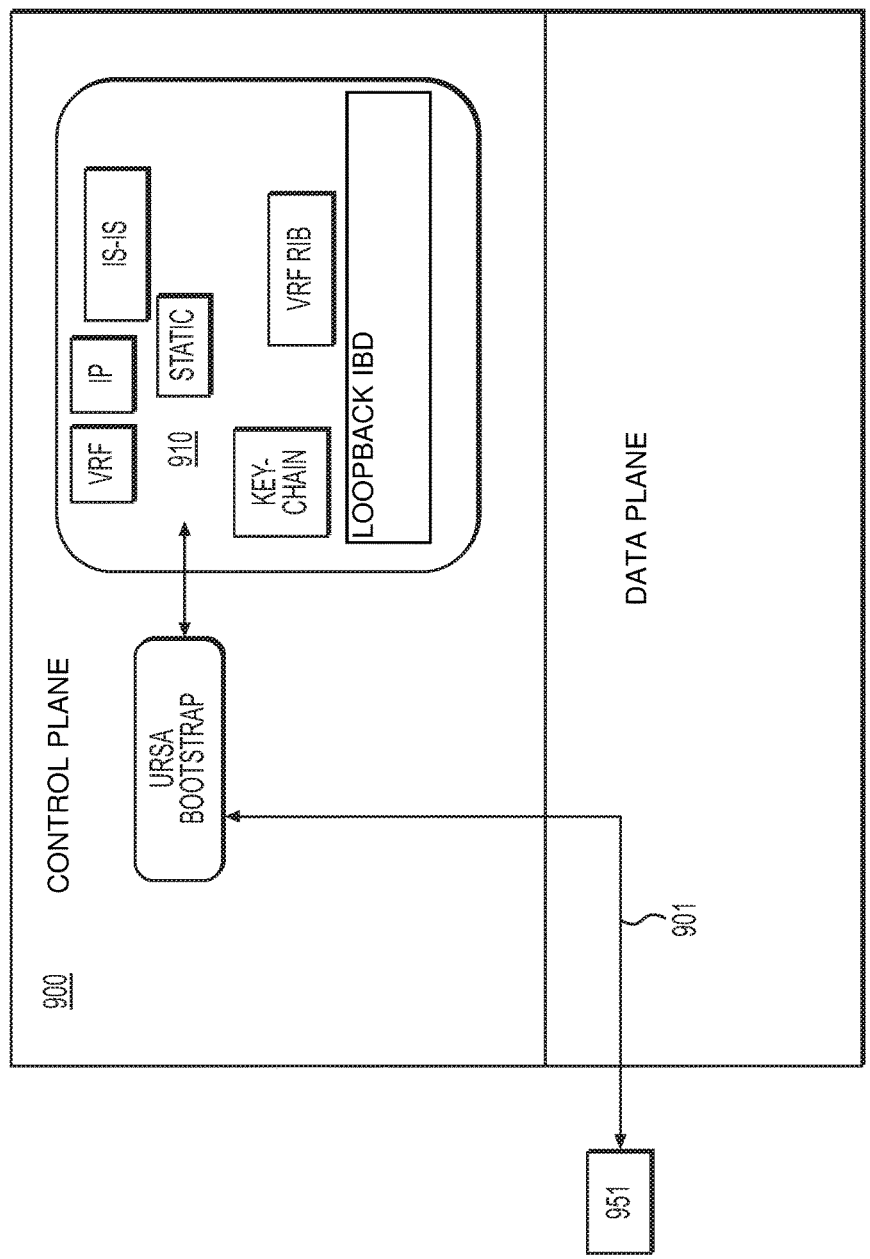
FIG. 9 is a schematic of a controller bootstrap operation implementing a network fabric that expands with legacy network nodes and implements self-healing procedures.

FIG. 9 shows more details regarding the bootstrap daemon that is programmed into URSA compatible nodes of this disclosure. The bootstrap daemon on the respective node hardware may programmed in commonly used formats, including but not limited to Linux. The bootstrap daemon provides:
  DHCP server on Controller and DHCP client on the rest of the switches in the fabric
  Simple CDP packet encoding and decoding with extensions for URSA discovery
  Interfacing with Certificate processing and SUDI
  HTTPs message exchange to from Controller
  Program switch with static routing, VRF, IP address on interfaces, IS-IS on interfaces
The IS-IS connection needs some extensions including to flag the role of member (Controller, AG or AC), indicate Active or Standby Controller role, and node-ID encoding.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, network device 102 may be applicable in other exchanges or routing protocols. Moreover, although network device 102 has been illustrated with reference to particular elements and operations that facilitate the communication process, these elements, and operations may be replaced by any suitable architecture or process that achieves the intended functionality of network device 102.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities may be implemented in software provisioned on networking device 102. In some embodiments, one or more of these features may be implemented in hardware, provided external to these elements, or consolidated in any appropriate manner to achieve the intended functionality. The various network elements may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, the network elements of FIG. 1 (e.g., network devices 102) described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that single processor and a single memory element are responsible for certain activities. In a general sense, the arrangements depicted in the Figures may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory 116) can store data used for the operations described herein. This includes the memory being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 114) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.'

The list of network destinations can be mapped to physical network ports, virtual ports, or logical ports of the router, switches, or other network devices and, thus, the different sequences can be traversed from these physical network ports, virtual ports, or logical ports.

The invention claimed is:

1. A method of discovering nodes in an existing network to accommodate communication between the existing network and a software defined network, the method comprising:
   operating a controller having a processor, connected to computer readable software stored in memory, as a first node in a network fabric of a network;
   connecting the controller to a second node that has a native network protocol,
   sending an initial discovery data packet from the controller to the second node wherein the initial discovery data packet advertises controller status information to the second node; and
   establishing a communications link between the controller and the second node in the network fabric using the status information;
   expanding the network fabric to include joining nodes of the existing network having respective native network protocols, the expanding comprising:
   identifying the second node as a first switching node connected to at least one joining node in the existing network;
   connecting the first switching node to an overlay database such that the first switching node updates the overlay database with updated address information for the at least one joining node and further updates the overlay database with additional address information establishing the first switching node as an egress for expansion discovery packets directed to the at least one joining node.

2. A method according to claim 1, further comprising:
   connecting the controller to a database;
   retrieving from the database an IP prefix;
   assigning a controller IP address and a second node IP address with the prefix;
   establishing an HTTPS communication session between the controller and the second node to enable the second node to receive the controller status information.

3. A method according to claim 2 further comprising receiving communications at the controller from the second node via a defined static route there between, wherein the second node uses the controller loopback address and the controller link IP address to establish the HTTPS communication.

4. A method according to claim 3 further comprising sending from the second node to the controller an identifier in a second discovery data packet.

5. A method according to claim 1, further comprising healing a connection in the network fabric, the healing comprising:
   identifying that a subject communications link, between additional nodes having respective node IDs on the network, has gone "DOWN" or "UP";
   transmitting a new discovery data packet from one additional node to the other additional node, wherein the one additional node has a lower node ID than the other additional node such that the one additional node assigns the IP addresses to reconnect the communications link.

6. A method according to claim 1, further comprising identifying, with a standby controller, that a controller communications link between at least one node on the network and an active controller has gone "DOWN";
   transmitting a new discovery data packet from the standby controller to the at least one node on the network to advertise the status information corresponding to the standby controller such that the at least one node communicates with the standby controller.

7. A method of discovering nodes in an existing network to accommodate communication between the existing network and a software defined network, the method comprising:
   operating a controller having a processor, connected to computer readable software stored in memory, as a first node in a network fabric of a network;
   connecting the controller to a second node that has a native network protocol,
   sending an initial discovery data packet from the controller to the second node wherein the initial discovery data packet advertises controller status information to the second node;
   establishing a communications link between the controller and the second node in the network fabric using the status information;
   connecting the controller to a database;
   retrieving from the database an IP prefix;
   assigning a controller IP address and a second node IP address with the prefix;
   establishing an HTTPS communication session between the controller and the second node to enable the second node to receive the controller status information;
   receiving communications at the controller from the second node via a defined static route there between, wherein the second node uses the controller loopback address and the controller link IP address to establish the HTTPS communication.

8. A method according to claim 7 further comprising sending from the second node to the controller an identifier in a second discovery data packet.

9. A method according to claim 7 further comprising expanding the network fabric to include joining nodes of an existing network having respective native network protocols, the expanding comprising:
   identifying the second node as a first switching node connected to at least one joining node in the existing network;

connecting the first switching node to an overlay database such that the first switching node updates the overlay database with updated address information for the at least one joining node and further updates the overlay database with additional address information establishing the first switching node as an egress for expansion discovery packets directed to the at least one joining node.

10. A method according to claim 7, further comprising healing a connection in the network fabric, the healing comprising:
identifying that a subject communications link, between additional nodes having respective node IDs on the network, has gone "DOWN" or "UP";
transmitting a new discovery data packet from one additional node to the other additional node, wherein the one additional node has a lower node ID than the other additional node such that the one additional node assigns the IP addresses to reconnect the communications link.

11. A method according to claim 7, further comprising identifying, with a standby controller, that a controller communications link between at least one node on the network and an active controller has gone "DOWN";
transmitting a new discovery data packet from the standby controller to the at least one node on the network to advertise the status information corresponding to the standby controller such that the at least one node communicates with the standby controller.

12. A method of discovering nodes in an existing network to accommodate communication between the existing network and a software defined network, the method comprising:
operating a controller having a processor, connected to computer readable software stored in memory, as a first node in a network fabric of a network;
connecting the controller to a second node that has a native network protocol,
sending an initial discovery data packet from the controller to the second node wherein the initial discovery data packet advertises controller status information to the second node;
establishing a communications link between the controller and the second node in the network fabric using the status information;
connecting the controller to a database;
retrieving from the database an IP prefix;
assigning a controller IP address and a second node IP address with the prefix;
establishing an HTTPS communication session between the controller and the second node to enable the second node to receive the controller status information;
receiving communications at the controller from the second node via a defined static route there between, wherein the second node uses the controller loopback address and the controller link IP address to establish the HTTPS communication;
sending from the second node to the controller an identifier in a second discovery data packet.

13. A method according to claim 12 further comprising expanding the network fabric to include joining nodes of an existing network having respective native network protocols, the expanding comprising:
identifying the second node as a first switching node connected to at least one joining node in the existing network;
connecting the first switching node to an overlay database such that the first switching node updates the overlay database with updated address information for the at least one joining node and further updates the overlay database with additional address information establishing the first switching node as an egress for expansion discovery packets directed to the at least one joining node.

14. A method according to claim 12, further comprising healing a connection in the network fabric, the healing comprising:
identifying that a subject communications link, between additional nodes having respective node IDs on the network, has gone "DOWN" or "UP";
transmitting a new discovery data packet from one additional node to the other additional node, wherein the one additional node has a lower node ID than the other additional node such that the one additional node assigns the IP addresses to reconnect the communications link.

15. A method according to claim 12, further comprising identifying, with a standby controller, that a controller communications link between at least one node on the network and an active controller has gone "DOWN";
transmitting a new discovery data packet from the standby controller to the at least one node on the network to advertise the status information corresponding to the standby controller such that the at least one node communicates with the standby controller.

* * * * *